United States Patent [19]
Gould et al.

[11] Patent Number: 5,789,840
[45] Date of Patent: Aug. 4, 1998

[54] ENDHEAD JOINT FOR STATOR BARS

[75] Inventors: Garry Michael Gould; David B. Knickle; Bruce William Mills, all of Peterborough, Canada

[73] Assignee: GE Canada Inc., Mississauga

[21] Appl. No.: 608,868

[22] Filed: Feb. 29, 1996

[51] Int. Cl.[6] .............................. H02K 1/00; H02K 11/00
[52] U.S. Cl. ................................. 310/179; 310/71
[58] Field of Search .......................... 310/71, 201, 208, 310/260, 270, 179

[56] References Cited

U.S. PATENT DOCUMENTS

| | | | |
|---|---|---|---|
| 4,649,308 | 3/1987 | Kranzler | 310/214 |
| 4,894,575 | 1/1990 | Nilsson et al. | 310/260 |
| 4,943,749 | 7/1990 | Ponce et al. | 310/260 |
| 5,270,598 | 12/1993 | Holly, III et al. | 310/71 |
| 5,331,240 | 7/1994 | Hyodo | 310/71 |
| 5,332,939 | 7/1994 | Fanning et al. | 310/71 |
| 5,545,939 | 8/1996 | Cooper | 310/270 |

*Primary Examiner*—Steven L. Stephan
*Assistant Examiner*—Michael J. Wallace, Jr.
*Attorney, Agent, or Firm*—Edward H. Oldham

[57] ABSTRACT

A dynamoelectric machine stator winding element which has a foreshortened end protruding from the stator of the machine when compared to prior art winding elements. The protruding end of the winding element has only a single bend in its protruding length, whereas the prior art elements always have two bends. A special connector for the winding elements straddles the bared end of each winding element. Connection of each member of the pair of connectors is facilitated by means of a common conducting member which is received in an aperture provided in each connector member.

13 Claims, 6 Drawing Sheets

5,789,840

ENDHEAD JOINT FOR STATOR BARS

This invention relates to an improvement in the method of connecting a pair of stator bars at one end of a dynamo electric machine so as to decrease the length of the ends of the stator bars protruding beyond the end of the stator. The reduction in stator bar length produced by this invention has two immediate effects.

Because the stator bar length is reduced without decreasing the length of the bar that is active. i.e. the part of the bar in the magnetic slot of the stator, the copper losses of the operating coil are reduced thus leading to an increase in the efficiency of the machine.

Secondly, the reduction in the protrusion of the ends of the bar beyond the end of the stator, the overall physical length of the dynamo electric machine may be reduced, leading to a reduction in materials used to produce the machine. The shortened machine will thus require less material for its housing and frame. The shaft may be shortened somewhat and will thus weigh less while exhibiting an increased shaft stiffness (because of the overall shortening).

Because of the change in the geometry of the stator bar ends which are being connected by means of this invention, it will be found that each pair of connected stator bars forms a robust assembly which will require less bracing and lashing than stator bars which were connected according to prior art techniques.

Problems of balance may be ameliorated and the initial capital cost of the machine is reduced. Because of the robustness of the construction and the particular geometry of the protruding ends of the bars used to make the joint, it is expected that reduced site problems will be encountered during the life of the machine and thus lead ultimately to reduced warranty costs.

Because of the particular manner of constructing the joint, the stress on the stator bar ends is substantially reduced (due to a decrease in length) and the particular components chosen to comprise the joint are robust and easily brazed together to produce a strong joint which may be readily disassembled in the field so as to enable service or replacement of a stator bar at a time much later in the service life of the machine.

This invention will reduce the mean length of turn for each resultant bar of a machine utilizing this invention which results in significant reduction in copper losses for the machine.

BACKGROUND OF THE INVENTION

Most alternating current dynamo electric machines require windings to be inserted into a slotted magnetic stator structure to produce a rotating magnetic field and most multi-phase machines are manufactured so that the two sides of any given bar are placed in two different slots in the stator of the machine.

In small machines where the coils are somewhat flexible, one side of the coil may be inserted into a stator slot (bottom winding) and the opposite side of the coil may be later maneuvered into the top of another slot (above a previously inserted bottom winding of another coil).

As machines increase in size, the coil sides become larger and larger until each coil side becomes a single bar composed of a large number of insulated conductors which are manufactured to produce a unitary body which is most rigid and is most resistant to deformation and bending.

In order to produce the required stator bar structure in large AC machines, it is necessary to insert a series of bars into the bottom of the stator core slots and subsequently insert a second set of stator bars (having a different geometry from the first set) into the tops of the core slots. When the stator bars are satisfactorily placed in the stator core, the bars are wedged into place by means of slot wedges, or some other appropriate fastening technique.

Because the bars are inserted into the stator in two pieces, it is necessary to join the bar ends to complete the winding circuitry. This technique has usually involved brazing the two ends of the bars together using some sort of connector device.

Because the two bars are placed in slots that are usually about one pole pitch apart, the two ends to be joined have usually been bent toward each other in a classical configuration involving two bends. The compound bends in the end of each stator bar are formed in each bar during the manufacture of the bar, and the classical shape used heretofore involves a substantial amount of each bar protruding beyond the end of the stator core.

Because of the success of the prior art method of construction, and the successful track record obtained by machines manufactured in this manner, little thought or effort has been expended to change or improve this method of construction of stator bars. Because the bars extend a substantial distance beyond the end of the stator core, some limited flexibility of the end of each bar exists which no doubt will make the operation of joining the two bar ends somewhat more easy than it might have been had the ends of the coil bars been shortened.

It is with a view to shortening the protruding ends of the stator bars that this disclosure is directed, and because of the resultant shortening of the bar ends, a completely different method of connecting the two bar ends will be disclosed.

SUMMARY OF THE INVENTION

This invention describes a stator bar which is of a different shape than the classical prior art bars, in that, the end of each coil bar which protrudes beyond the end of the stator core is much shorter than prior art bars and as such has only one bend and instead of two as shown in the prior art. Because of the change in the geometry and location of the joint where the two bar ends are joined, the hardware devices of the prior art must be discarded and new hardware developed to produce a satisfactory joint.

To this end a pair of "universal joint" connectors are disclosed which may be fitted at each stator bar end and joined by a common element so as to permit each joint member of the jointed pair to be twisted through a limited arc and thus captivate the common element. The common element permits each of the joint members to be rotated through a small angle in order to obtain an optimum fit between the joint member and the bar and yet provide an excellent connection between the two joint members comprising the "universal joint". A conductive pin provides the pivoting action between the joint members so that the joint members may be installed on each bar end and be pivoted to provide alignment for the conductive pin. The joint members may then be brazed to the bar ends and then to each other.

DESCRIPTION OF THE PREFERRED EMBODIMENT

Figure 1A:
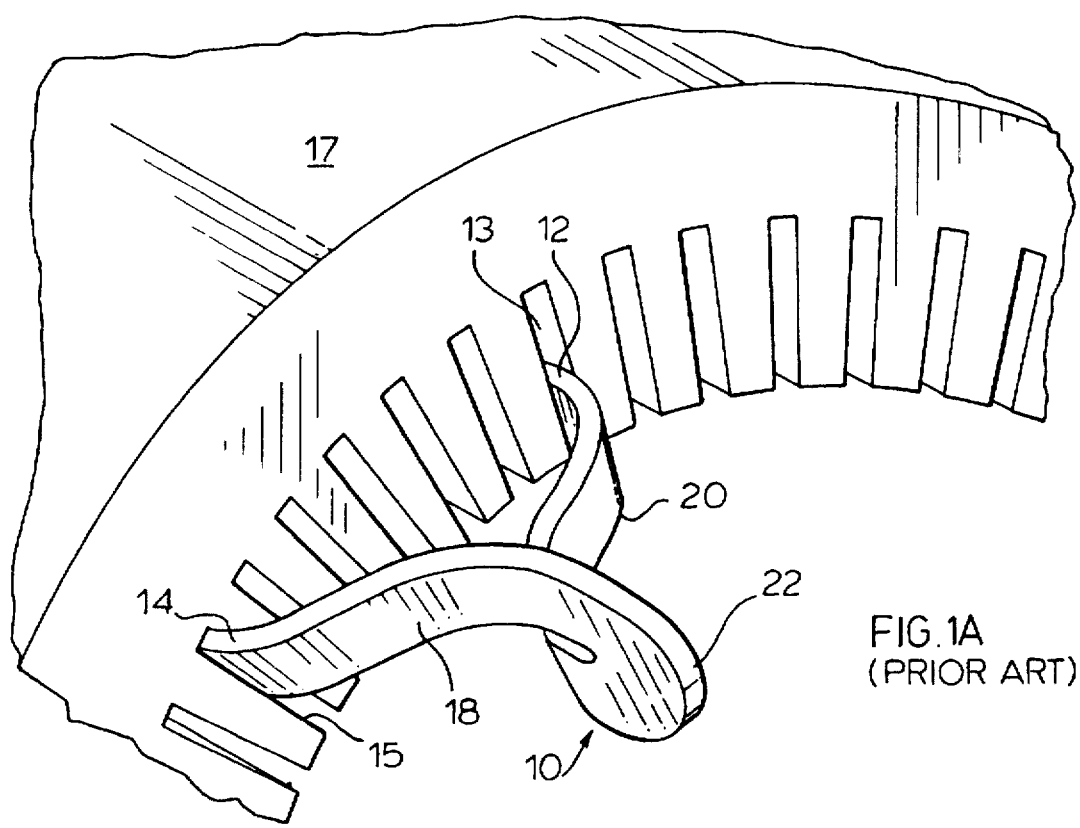
FIG. 1A shows a coil end shape used in prior art applications where the coil end provides a limited amount of flexibility.

Referring now to the drawings, FIG. 1 illustrates the shape and location of a coil 10 having a traditional prior art shape. In this instance, coil 10 is shown having active legs 12 and 14 inserted into stator slots 13 and 15 at the top and bottom of the appropriate slots of the stator 17.

For small coils having limited flexibility in the extensions 18 and 20 and coil loop 22, this classical coil shape permits all the coil legs of the stator winding to be progressively inserted into the bottom of the stator slots and because some flexibility exists in parts 18, 20 and 22 of the coils, the remaining coil sides may then be inserted into the top of the stator slots and wedged tightly into place.

As machine ratings increase, the size of the coils inserted into the stator are increased to the point where the flexibility of the end joint is negligible and the weight of a complete coil becomes so great that the installation becomes almost impossible.

Figure 1B:
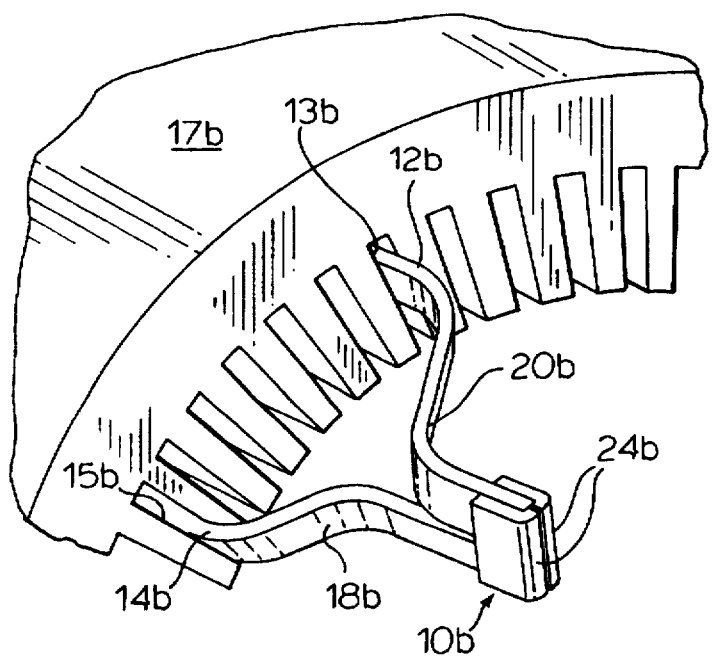
FIG. 1B shows a prior art stator bar connection technique in perspective.
Figure 2A:
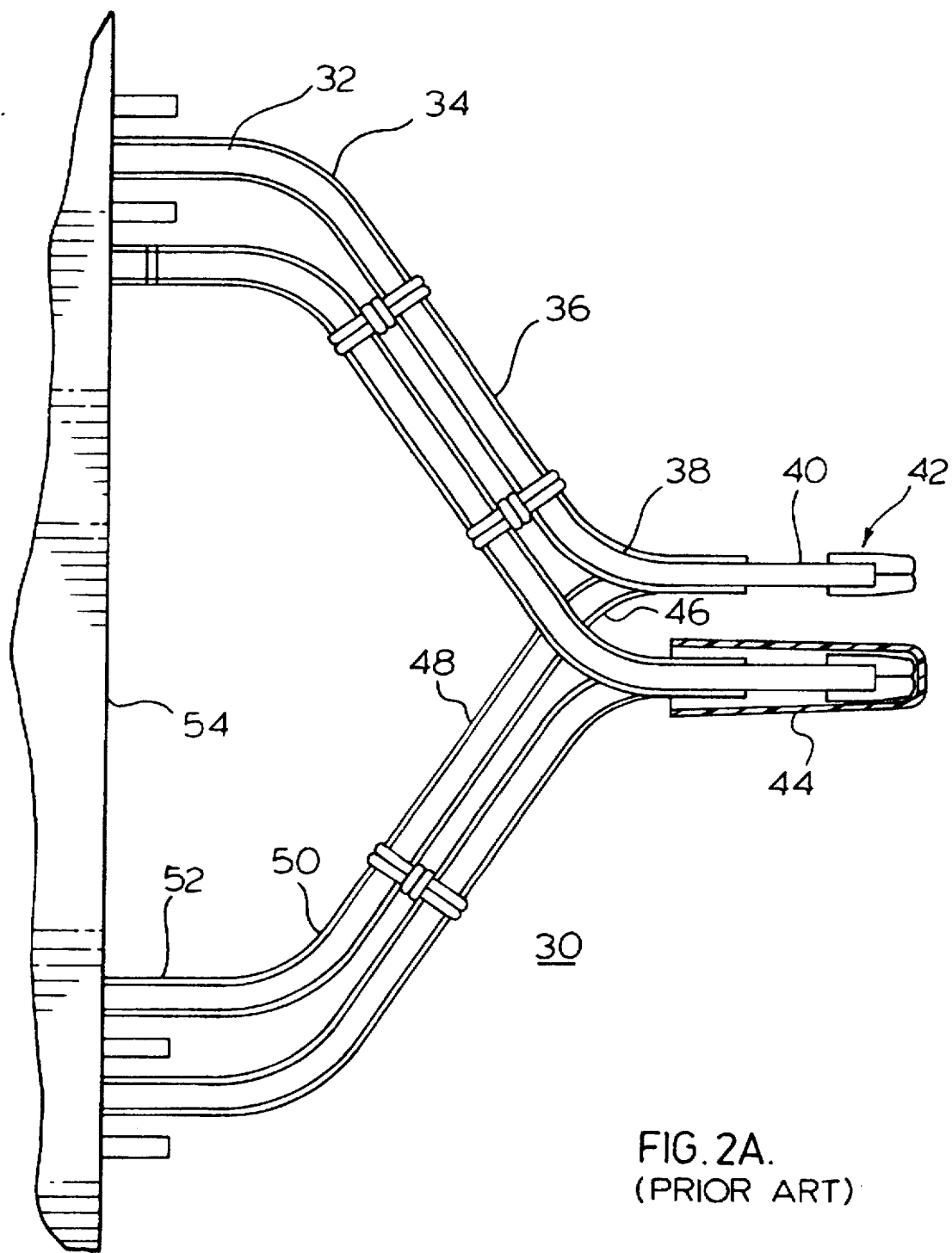
FIG. 2A is a front view of a stator end joint for stator bars using a prior art construction.
Figure 2B:
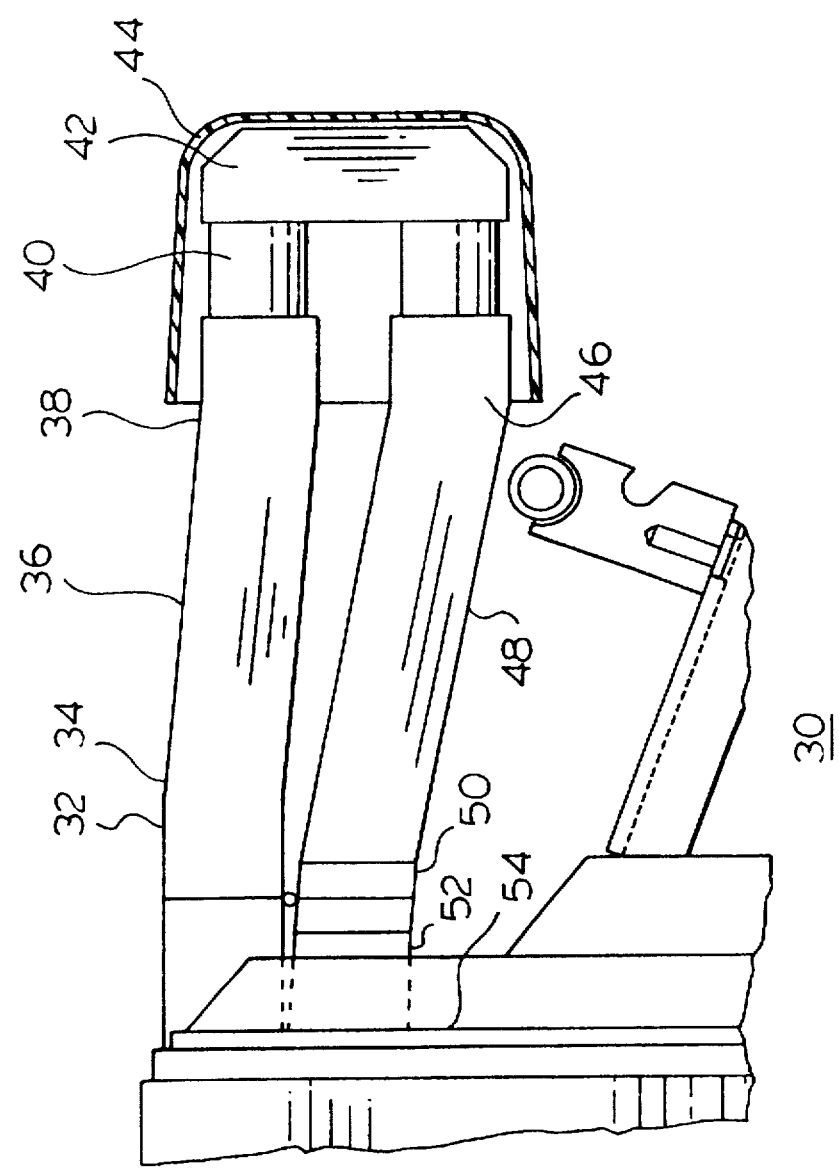
FIG. 2B is a side view of the joint construction of FIG. 2A.

FIG. 1B shows a perspective at a connection for a pair of bars 12b and 14b. The two bars are connected by a pair of conductive clips 24b generally brazed to the ends of bars 12b and 14b. FIG. 1B will be shown in more detail in FIGS. 2A and 2B FIGS. 2A and 2B shows a prior art construction 30 of connecting stator bars 32 and 52. In this instance, the stator bars are massive and may extend several feet in the stator slots. Each stator bar 32 and 52 is composed of many individual conductors separated by an insulating material which causes the finished bar to be relatively inflexible. Bar 32 is located in the top of the stator slot and bar 52 is located at the bottom of the stator slot.

Bar 32 is bent at 34 and end arm 36 extends to bend 38 which leads to end 40 which is subsequently stripped of the outside insulation exposing the bar conductors. Connectors 42 are brazed or otherwise connected to the exposed conductors of exposed end 40 of bar 32. Similarly the exposed end 46 of the opposite bar 52 is brazed to connectors 42 to the complete the end connection of the two bars 32 and 52.

This method of joining stator bars has been used universally in virtually every dynamo electric machine where stator bars have been used in the construction of the machine. Note that both bars 32 and 52 have bends at 34, 38, 46 and 50.

Figure 3:
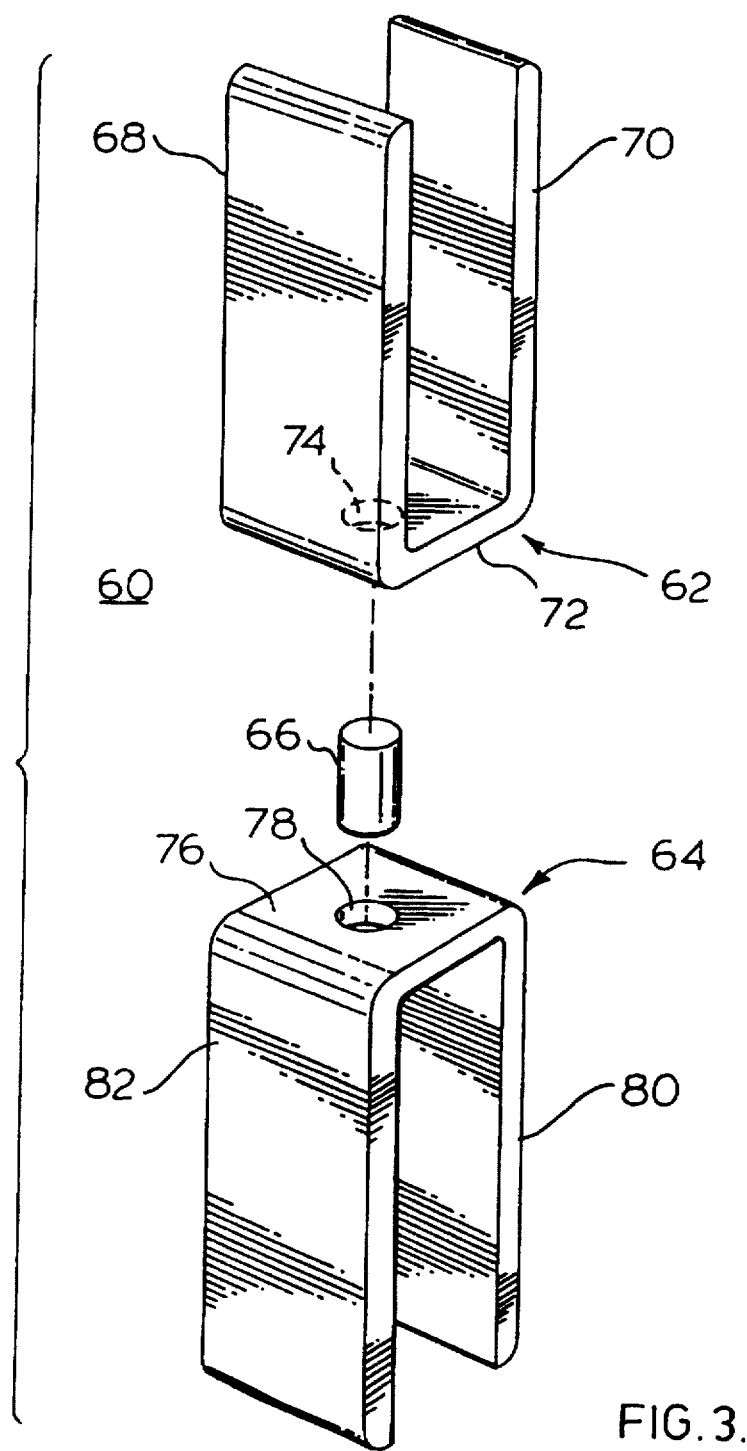
FIG. 3 shows the "universal joint" members utilized in making coil bar end joints utilizing this invention.

FIG. 3 shows a connector 60 which makes possible the elimination of the second bend (such as 38 and 46 shown previously) of the stator bars. Connector 60 is shown having a pair of "U" shaped saddle members 62 and 64, and central connector pin 66.

Member 62 has a pair of legs 68 and 70 connected to end face 72. Face 72 has an aperture 74 in the center thereof to receive cylindraceous member 66.

Similarly, member 64 is shown having an end face 76 having aperture 78 therein for receiving member 66 therein.

Member 64 has the same shape as member 62 and thus has legs 80 and 82 extending from the end face 76. The members 62, 64 and 60 will usually be formed from copper or an alloy thereof.

Figure 4:
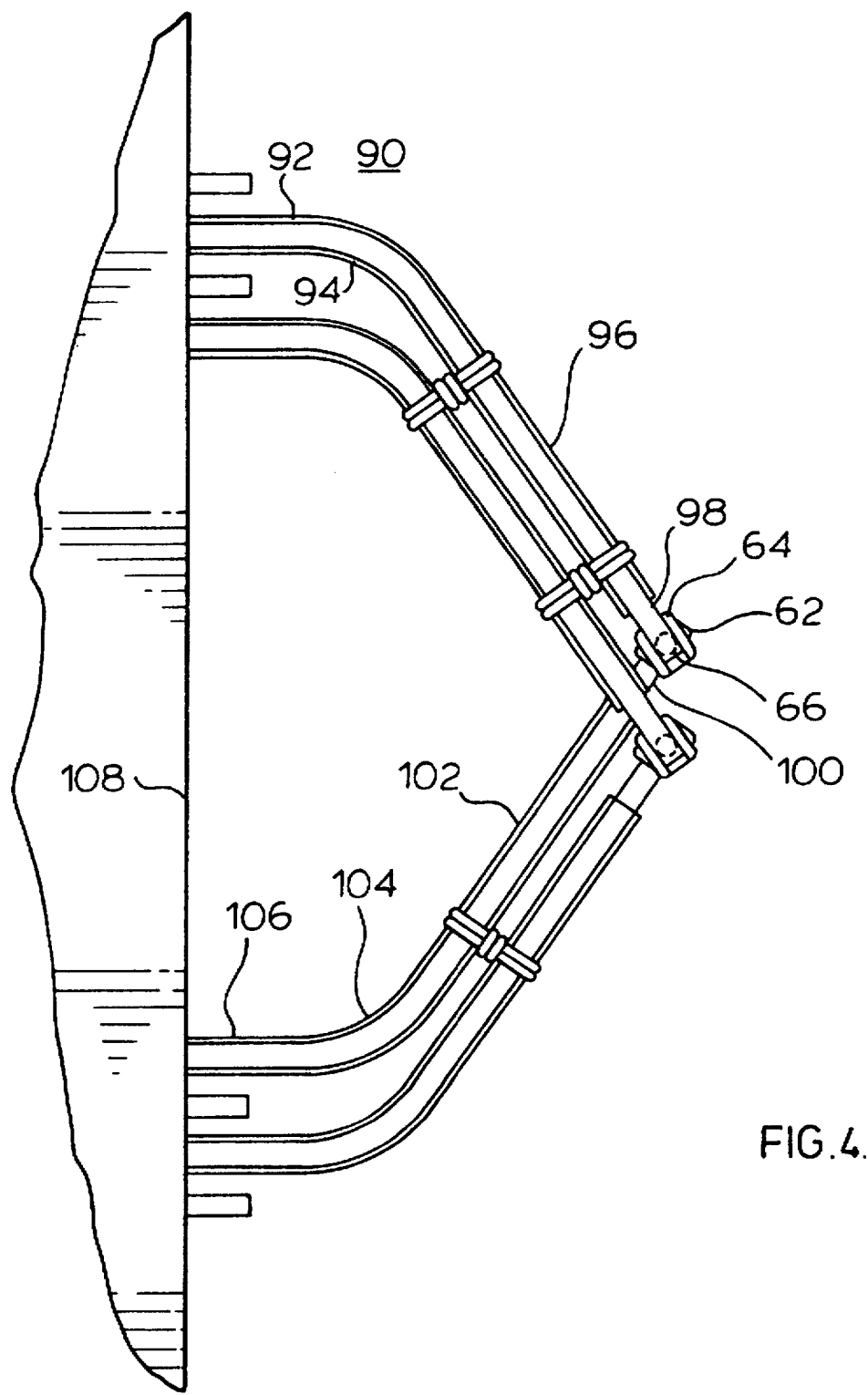
FIG. 4 shows a front view of the method of connecting two stator bars according to this invention.

FIG. 4 shows a front view of a stator bar arrangement for a dynamo electric machine utilizing the connector of FIG. 3. The legs 68 and 70 of connector 62 are slid over the bared end 98 of bar 92 and similarly legs 80 and 82 of connector 64 are slid over the bared end 100 of bar 106. Pivot pin 66 is inserted into the two aligned apertures 74 and 78 after the connectors 62 and 64 are slid into their proper position. The members 62 and 64 may be brazed together while the legs of each connector are brazed to the bared ends 98 and 100 of bars 92 and 106. The connector makes a very compact connection of the stator bar ends possible.

Figure 5:
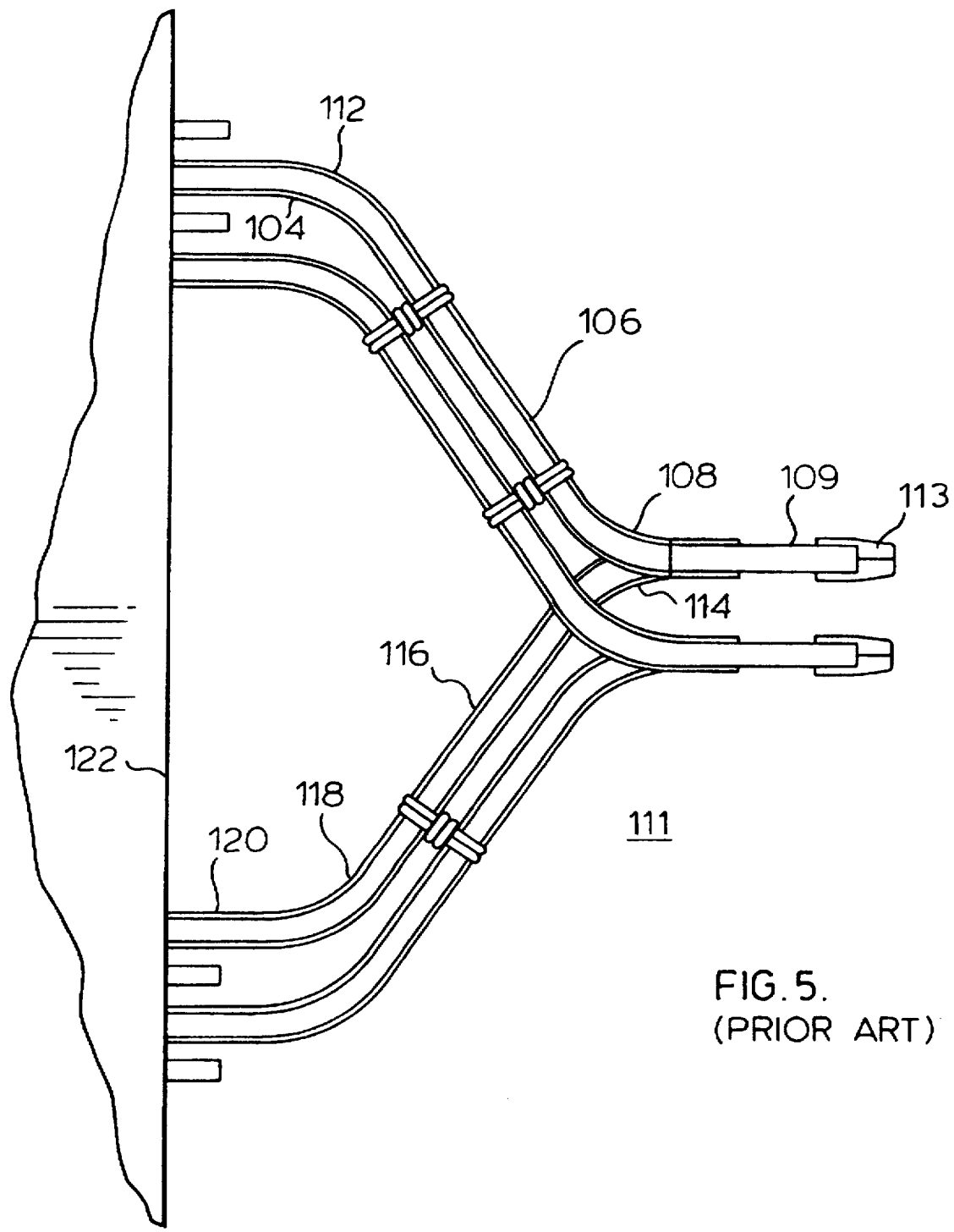
FIG. 5 shows a front view of the construction and material required for a comparable joint to the joint of FIG. 4 using the prior art technique.

To provide a comparison with the prior art connection techniques, FIG. 5 shows the same stator bar arrangement where the respective bars 112 and 120 are connected in a conventional connection device 113.

It will be immediately apparent that bends 108 and 114 of bars 112 and 120 have been eliminated by the connection technique of this invention as exemplified by FIG. 4. The length of the stator bar arm has undergone a significant shortening which will allow the machine length to be shortened accordingly.

The shortening of the ends of the ends of the bars has several immediate effects:

the copper loss of each bars is reduced in accordance with the shortening of the mean length of turn, thus, the copper losses of the stator are significantly reduced increasing the machine efficiency. Because the connection technique eliminates one of the bends in the stator bar, the manufacturing cost of the stator bar will be reduced.

The length of the stator housing may be reduced due to the reduction in the length of the end winding height, thus reducing the capital cost of the machine. Because the length of the housing may be reduced, the rotor shaft may be shortened accordingly. This has the effect of improving the shaft stiffness which will increase the ease with which the rotor is balanced. Of course, the cost of the rotor shaft will be reduced too.

The decrease in the length of the protruding stator bar arms tends to reduce the bending of the arms during short circuit conditions. This feature will improve performance under adverse conditions, and warranty costs will be substantially reduced. Bracing and lashing of the protruding stator bar ends tends to be less expensive as well.

In instances where this invention is applied to very large machines such as waterwheel generators, a reduction in the length of the machine directly influences the depth of pit and the height of the bay in which such machines operate. Building height may be reduced leading to substantial savings in construction cost.

In the final analysis, if a stator bar fails during the life of the machine, the connector of this invention is easier to disassemble, allowing decoupling of members 62 and 64 by application of heat.

If during subsequent operation, a bottom stator bar fails for some reason, the prior art connection technique requires that several top bars must be removed to provide space to remove the failed bottom bar.

It is therefore seen that this invention will not only improve the operating efficiency of the overall machine, but will have a definite influence on the initial capital cost and the projected warranty costs. Repair costs for bar replacement during the life of the machine could be substantially reduced too.

While changes and alterations of applicant's invention will be apparent to those skilled in the art, applicant prefers to limit the scope of the invention by the coverage provided in the appended claims.

We claim:

1. A large ac dynamoelectric machine having a housing and frame for supporting a stator core and a rotor therein, said stator core comprising annularly shaped magnetic punchings stacked together to form a cylindraceous magnetic structure having a cylindrical bore therein, said magnetic structure having a plurality of spaced parallel slots extending axially along the length of said stator core and opening into said stator bore, a plurality of stator winding elements being inserted into the stator slots, each winding element extending a short distance beyond each end of said stator, wherein the extending portions of the winding elements have only a single bend therein wherein said single bend is substantially less than a right angle.

2. A dynamoelectric machine as claimed in claim 1 wherein each winding element is connected to another winding element located in another slot by means of a suitable connecting device.

3. A dynamoelectric machine as claimed in claim 2 wherein the connecting device comprises a pair of co-operating conductive members wherein a first member of each pair is connected to one end of a preselected winding element to be joined to said another winding element, a second member of said pair connected to the end of said another winding element, and the first and second members of said pair of the connection devices are connected together to form an electrical connection between the preselected and said another winding element.

4. A dynamoelectric machine as claimed in claim 3 wherein said connection devices are composed of copper or an alloy thereof, and each conductive member of said pair has a flattened end which has a central cylindraceous aperture extending therethrough, each of said conductive members are arranged to embrace the end of the winding element to which it is connected, and each conductive member of said pair houses a common cylindrical conducting element.

5. A stator bar for use in a large ac dynamoelectric machine wherein said stator bar comprises three sections, a first section being a central linear section for accommodation in a slot of the stator of the dynamoelectric machine, and a pair of end sections being integrally formed on each end of said central section and being located outside said slot in said dynamoelectric machine, each end section having means for accepting a connection device near the end of each end section, and each end section having only one single bend along its length.

6. A stator bar as claimed in claim 5 wherein said bar comprises a plurality of insulated conductors formed into a unitary body of generally rectangular cross section, which body is covered with a layer of groundwall insulation and wherein, areas of said end sections are bared to receive connection devices.

7. A stator bar as claimed in claim 6 wherein a connection device is attached to the bared end section area, wherein said connection device comprises a U shaped conductor having a pair of substantially parallel legs extending from a flat bight end of said U shaped connector device, wherein said legs are spaced apart a distance sufficient to straddle the bared area of said end section.

8. A stator bar as claimed in claim 7 wherein said connectors are copper or an alloy thereof and the connectors are brazed to said end section.

9. A stator bar as claimed in claim 8 wherein said connector has a cylindraceous aperture in the center of said flattened bight of U shaped connector.

10. A stator bar as claimed in claim 9 wherein said connector is joined to a similar connector on a second stator bar located in another slot of said dynamoelectric machine, wherein each of the connector devices being co-joined have a common cylindrically shaped conducting element located in their cylindraceous apertures.

11. A connection device for stator bars of large dynamoelectric machines comprising, a U shaped brazable conductive member having a substantially flat end portion having a pair of spaced apart, substantially parallel legs integrally attached thereto and extending therefrom, said connection device having a cylindraceous aperture in said end portion suitable for receiving a suitable cylindrical conducting member.

12. A connection device as claimed in claim 11 wherein said connector device has a space between said legs suitable to straddle the end of a stator bar to which it is to be brazed, and said connection device is connected to a second similar connection device wherein the two flat end portions of the connection devices are butted together and said suitable cylindrical conducting member is slidably received in both cylindraceous apertures.

13. A connection device as claim 12 wherein the connection devices are copper or alloy thereof.

* * * * *